United States Patent [19]

Lohneis et al.

[11] E Re. 28,814

[45] Reissued May 18, 1976

[54] INDEX AND TABLE DRIVE MEANS FOR A MACHINE TOOL

[75] Inventors: Earl R. Lohneis, Milwaukee; Richard E. Stobbe, Greenfield, both of Wis.

[73] Assignee: Kearney & Trecker Corporation, West Allis, Wis.

[22] Filed: June 20, 1973

[21] Appl. No.: 371,753

Related U.S. Patent Documents

Reissue of:

[64] Patent No.: 3,587,390
Issued: June 28, 1971
Appl. No.: 3,978
Filed: Jan. 19, 1970

[52] U.S. Cl. ..... 90/58 B; 90/13 C
[51] Int. Cl.[2] ..... B23C 1/14; B23Q 1/16
[58] Field of Search ..... 90/58 R, 58 B, 58 C, 90/13.99–13 C; 318/574

[56] References Cited

UNITED STATES PATENTS

| | | | |
|---|---|---|---|
| 3,079,522 | 2/1963 | McGarrell | 318/62 |
| 3,125,796 | 3/1964 | Brainard | 29/26 |
| 3,175,190 | 3/1965 | Gasser | 340/147 |
| 3,497,780 | 2/1970 | Leenhouts | 318/574 |
| 3,513,730 | 5/1970 | Lohneis | 74/826 X |

OTHER PUBLICATIONS

K & T Bulletin, WA-14B of Apr. 1957.

*Primary Examiner*—Travis S. McGehee
*Assistant Examiner*—Z. R. Bilinsky
*Attorney, Agent, or Firm*—Cyril M. Hajewski

[57] ABSTRACT

A single drive and control means is selectively engageable to provide either rectilinear movement to the table base or rotary movement of an index table carried by the table base.

5 Claims, 7 Drawing Figures

INVENTOR
EARL R. LOHNEIS
RICHARD E. STOBBE
ATTORNEY

INVENTOR
EARL R. LOHNEIS
RICHARD E. STOBBE
ATTORNEY

INVENTOR
EARL R. LOHNES
RICHARD E. STOBBE
ATTORNEY
Thomas A. Hauke

INVENTOR
EARL R. LOHNEIS
RICHARD E. STOBBE
ATTORNEY

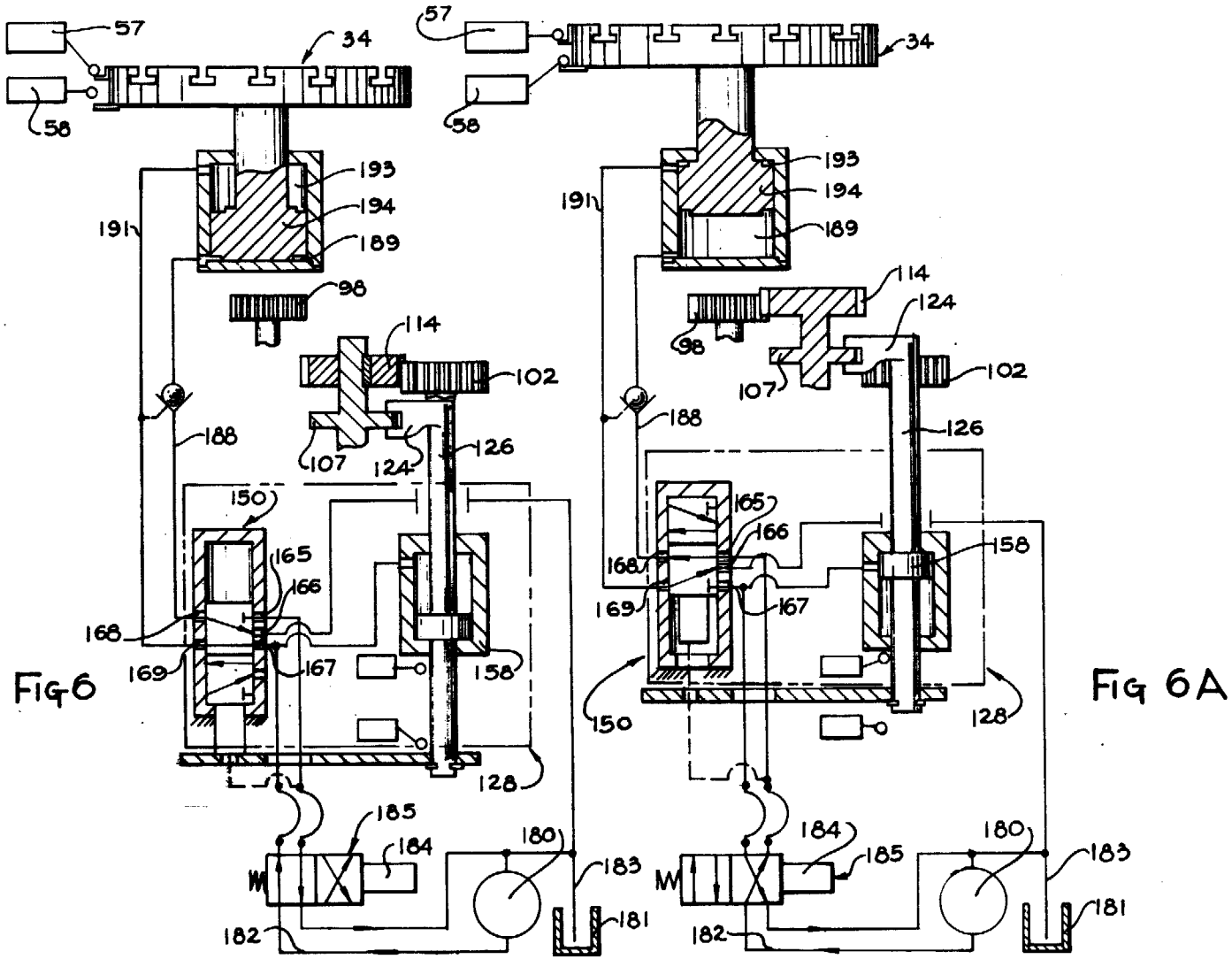
INVENTOR
EARL R. LOHNEIS
RICHARD E. STOBBE
ATTORNEY
Thomas A. Hantic

INDEX AND TABLE DRIVE MEANS FOR A MACHINE TOOL

Matter enclosed in heavy brackets [ ] appears in the original patent but forms no part of this reissue specification; matter printed in italics indicates the additions made by reissue.

BACKGROUND OF THE INVENTION

The present invention relates to a single drive and control means for providing rectilinear movement to a table base and rotary movement to an index table of a machine tool, selectively.

Prior to this invention, the inclusion of an index table in the table base of a machine tool added greatly to the mechanical complexity and cost of the machine tool. This was due to the necessity of providing a separate driving means for both the supporting table base and the index table, which necessitated duplicating the numerous flexible couplings, fittings, hoses, wires, and the like required to energize and control the separate driving means for the index table and the separate driving means for the movable table base.

SUMMARY OF THE INVENTION

It is, therefore, the object of the present invention to provide a simple, inexpensive means for providing rectilinear motion to a table base and rotary motion to the index table of a machine tool through the operation of a single drive and control means.

According to the present invention, there is provided to a machine tool having a bed supporting a table base for rectilinear movement along the bed. The table base includes at least one index table carried thereby and rotatably indexable about its own axis and relative to the table base on which it is supported. A single means comprising a common drive, a control means and a coupling means operable to engage the drive and control means to operate either the table base or index table selectively.

BRIEF DESCRIPTION OF THE DRAWINGS

FIGS. 6 and 6A are diagrammatic views of the hydraulic circuit depicting the various positions of an index table.

DESCRIPTION OF THE PREFERRED EMBODIMENT

Figure 1:
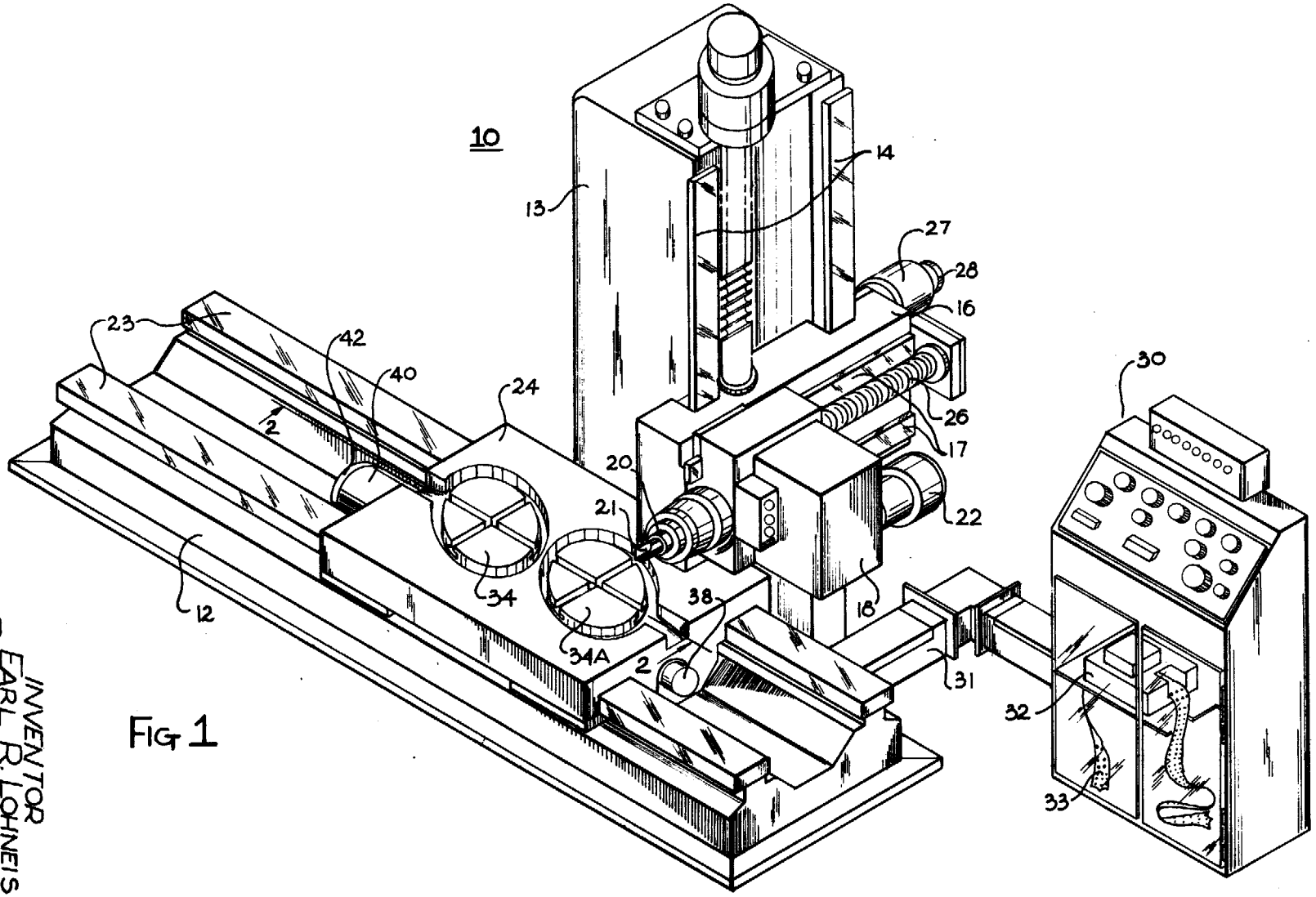
FIG. 1 is a perspective view of a machine tool incorporating the features of the present invention.

Referring now to FIG. 1, there is shown therein a machine tool of the type with which the present invention may be employed. Machine tool 10 includes a bed 12 which supports a vertical column 13. The vertical column 13 contains a pair of ways 14 on which is mounted a saddle 16, for vertical movement along the Y-axis relative to the column. Saddle 16 includes a second set of ways 17 on which is mounted for horizontal movement along the Z-axis, a spindle head 18. Spindle head 18 contains a tool spindle 20 in which is inserted metal working tool 21. Tool spindle 20 is rotated by motor 22.

Machine tool bed 12 is provided with a pair of longitudinal ways 23, which support a table base 24 for horizontal movement along the X-axis in front of column 13 and spindle head 18.

A lead screw 26 engages a nonrotatable nut (not shown) in spindle head 18 and moves spindle head 18 along the Z-axis of the machine tool when the former is rotated. The lead screw may be rotated by any suitable means such as the electric motor 27. A rotary signal generator 28, which may be of the photoelectric or electromagnetic type, is affixed to electric motor 27 to provide a series of pulses or signals corresponding to the rotation of the electric motor 27 to an automatic control means 30. Electric motor 27 and the other motors employed in machine tool 10 may be energized and regulated by the automatic control means 30 connected to the machine tool 10 by conduit 31. The automatic control means 30 includes a tape reader 32 which reads recorded data on punched tape 33 in a well-known manner to provide the operating control signals to the machine tool.

Figure 2:
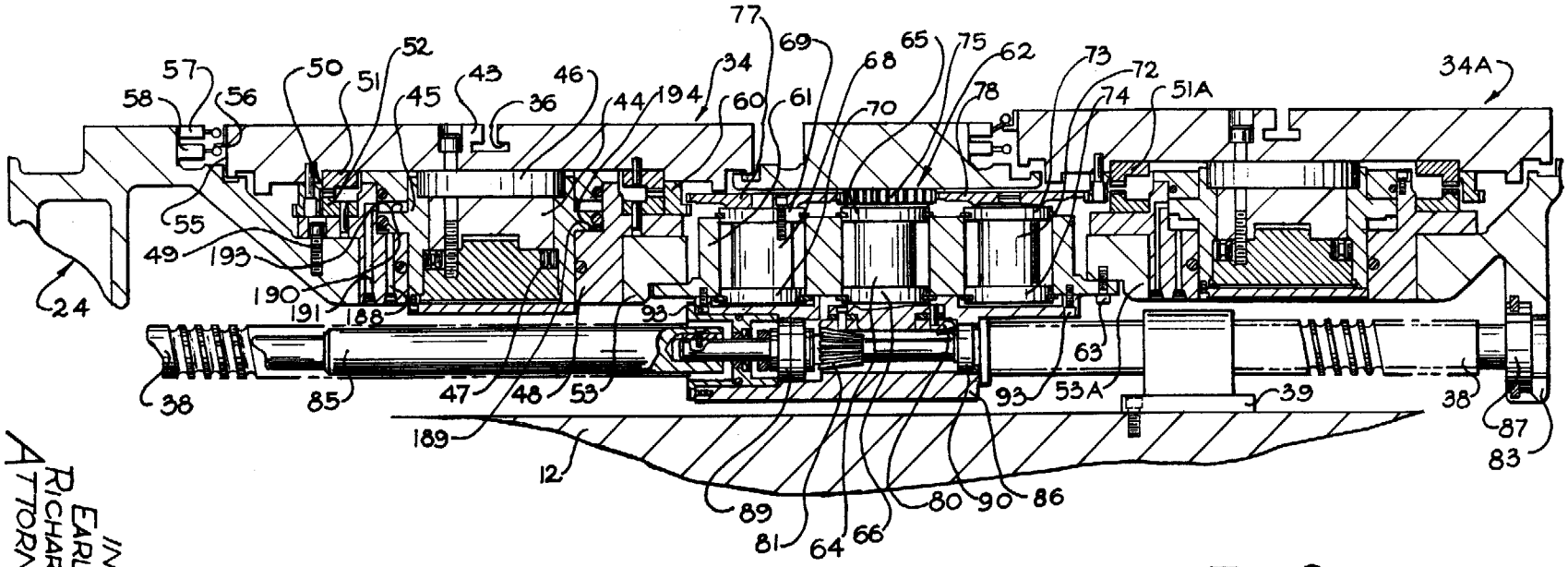
FIG. 2 is a fragmentary, enlarged view in vertical section through the table base and supporting bed, taken in a plane along the lines 2—2 of FIG. 1 and showing table 34 in the stationary or nonmovable position and table 34A in the rotating position.
Figure 3:
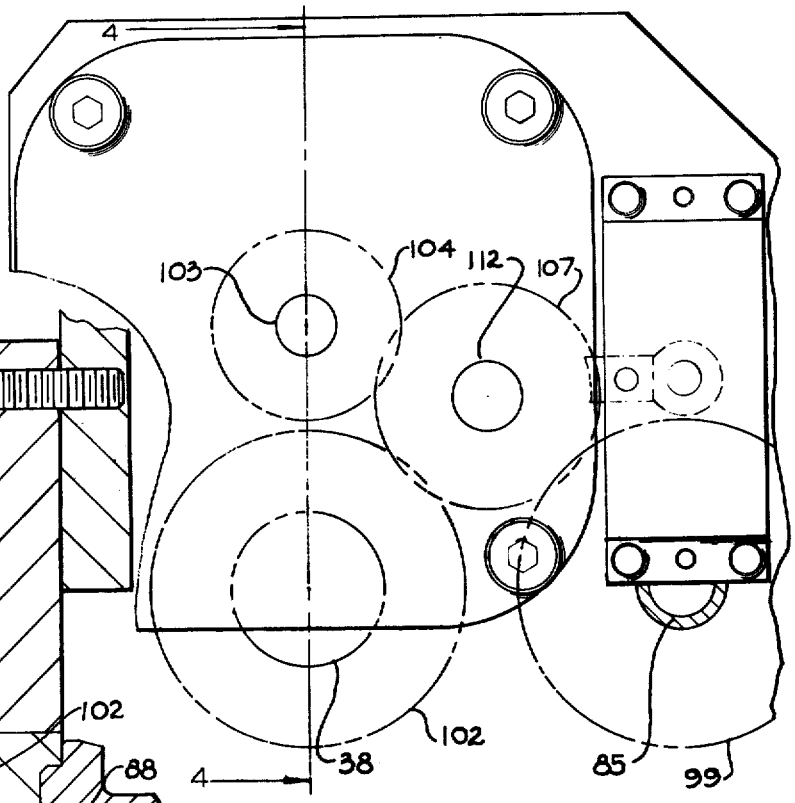
FIG. 3 is an end view of the table base showing the relationship of the input drive shafts for effecting X-axis movement of the table base and rotary motion of the index table.

FIG. 2 shows an embodiment of the present invention in which the table base 24 is provided with a pair of index tables 34 and 34A. The inclusion of such a pair of index tables is desirable to permit the workpiece on one of the tables to be machined while the previously machined workpiece on the other index table is removed and a new workpiece is affixed to the table. Table base 24 is then moved or shuttled so that the new workpiece undergoes the machining operation while the previously machined workpiece is removed.

The index tables are each rotatably movable on the table base 24 about their own axis which extends through the table base and parallel to ways 14 and the Y-axis of machine tool 10 so that the workpiece may be rotated on the table base without the necessity of unclamping and reclamping the workpiece to the table base. Such rotary motion of the index tables is in addition to the relative motion of table base 24 and spindle head 18.

As shown in FIG. 2, the table base 24 is slidably mounted on ways 23 and moved along the ways by a lead screw 38 extending through nut 39, which is secured to the machine bed 12. Lead screw 38 is rotated in either direction by an electric motor 40, shown in FIG. 1, which is provided in a well-known manner with a rotary signal generator 42 to provide a series of pulses or signals corresponding to the number of rotations of motor 40.

The construction and operation of table 34A is the same as 34, so the following description of table 34 will apply to table 34A.

Index table 34 includes the flat disc portion 43 containing T slots 36. A column 44 extends downwardly from disc 43 along the axis of rotation of index table 34. Index table 34 is journaled in a collar 45 by means of an upper bearing 46 and a lower bearing 47. Collar 45 is, in turn, fitted in a sleeve 48 for axial movement in the sleeve. Such axial movement permits the raising and lowering of the index table 34 with respect to table base 24. Sleeve 48 is secured to a circular web member 53 formed in the table base 24 by means of screws 49.

Index table 34 is prevented from moving when it is in its lowermost position by operation of a toothed coupling 50. The toothed coupling 50 is formed of a pair of rings 51 and 52 having engaging teeth projecting from the opposing annular planes of the rings. When the teeth are engaged, as shown by table 34, relative rotary motion between rings 51 and 52 is prevented. When the teeth are disengaged, as by raising ring 51A, as shown by the position of table 34A, relative rotation between the two rings is permitted.

Ring 51 is mounted on the underside of disc 43 of index table 34 with its teeth extending downwardly so as to engage the upwardly extending teeth of ring 52 mounted on sleeve 48.

The toothed coupling 50 also provides a means for accurately controlling the positioning of index table 34. For this purpose, the number of teeth cut in the rings corresponds to the minimum indexing increment desired. For example, if it is desired to index table 34 every 5° of arc, 72 teeth are cut into each of the rings 51 and 52. Thus, teeth may be fully engaged only every 5° of rotation of index table 34 and accurate indexing of the table into these 5° increments is insured.

The periperal surface 55 of index table 34 contains a limit switch actuator 56 which actuates limit switches 57 and 58 in a manner hereinafter described.

Figure 4:
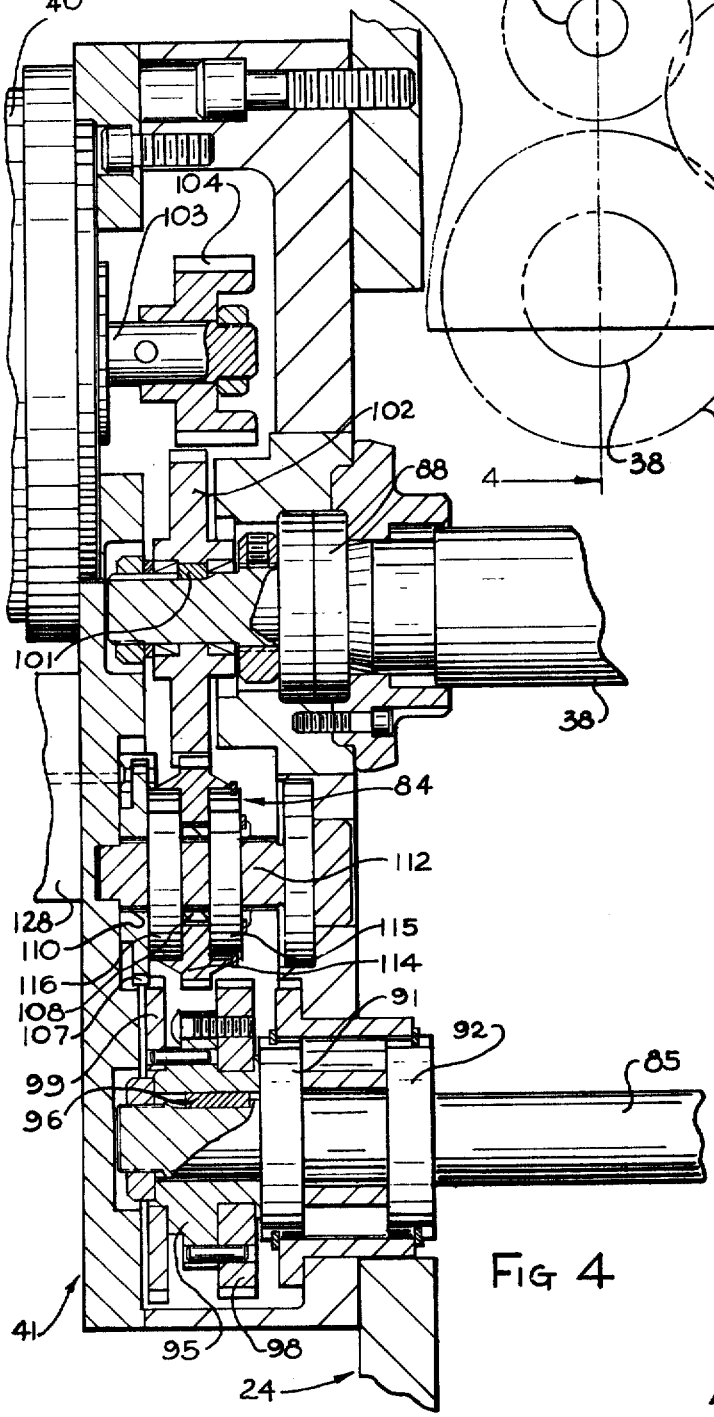
FIG. 4 is a developed view of the drive mechanisms taken in the plane represented by the line 4—4 in FIG. 3.

Index table 34 is indexed or rotatably moved by a motion translating means interposed between the table base 24 and the index table 34. Such motion translating means includes a ring gear 60 which is secured to the underside of the disc portion 43 of the table 34 adjacent the toothed coupling 50. Table base 24 has an idler gear assemblage 62 disposed between the two index tables 34 and 34A. A carrier 61 is secured to the web members 53 and 53A of the table base 24 by screws 63. The carrier 61 is provided with three in-line circular openings in which shafts 64, 68 and 72 are rotatably supported. To this end shaft 64 is supported in the central opening in carrier 61 by bearings 65 and 66; shaft 68 is supported in the lefthand opening, as viewed in FIG. 2, by bearings 69 and 70; and shaft 72 is supported in the right-hand opening, as viewed in FIG. 2, by bearings 73 and 74. A spur gear 75 is mounted on the upper end of shaft 64 so as to engage both a gear 77, which is mounted on shaft 68, and a gear 78, which is mounted on shaft 72. A ring gear 80 is mounted on the lower end of shaft 64 so as to engage with a gear 81 which is secured on a reduced inner end portion of a horizontal index drive shaft 85. Index drive shaft 85 is rotatably supported at its rightward end by bearing 89 and 90 located in a support block 86, which is secured by screws 93 to the bottom of carrier 61, as illustrated in FIG. 2. The left end of shaft 85 is rotatably supported in bearings 91 and 92, as shown in FIG. 4, located in the gear drive box 41. A driving sleeve 95 is secured to shaft 85 by a key 96. Mounted on the right end of sleeve 95 is an index table drive gear 98 and mounted on the left end of sleeve 95 is an index locking gear 99.

In normal operation, when rotary movement of index tables 34 or 34A is not desired, the index tables remain in the lowered position as depicted by the position of index table 34 in FIG. 2. Under this condition the index table drive shaft 85 is disconnected from motor 40 by a shiftable gear assembly 84 which will hereinafter be described. When motor 40 is disconnected from index table drive shaft 85, it is connected to drive the X-axis screw 38 and thereby move table base to the desired X-axis position. At this time shaft 85 and the idler gear assemblage 62 do not rotate while machine tool 10 is in its nonindexing mode of operation. This results in a more favorable torque to inertia ratio for the X-axis drive motor 40. This also results in less wear in the mechanical parts of the index drive because the index drive is engaged only during the actual indexing movements of the tables 34 and 34A.

X-axis drive screw 38 is rotatably supported by a bearing 87 located in end surface 83 of the table base 24, as shown in FIG. 2, and a bearing 88 carried in a gear drive box 41, as shown in FIG. 4, which is secured to the outer surface of the table base 24 located at the other end of the table base 24. An X-axis drive gear 102 is secured to the left end of screw 38 by a key 101. The output shaft 103 of the DC drive motor 40 is provided with a ring gear 104 which is keyed thereto.

Figure 5:
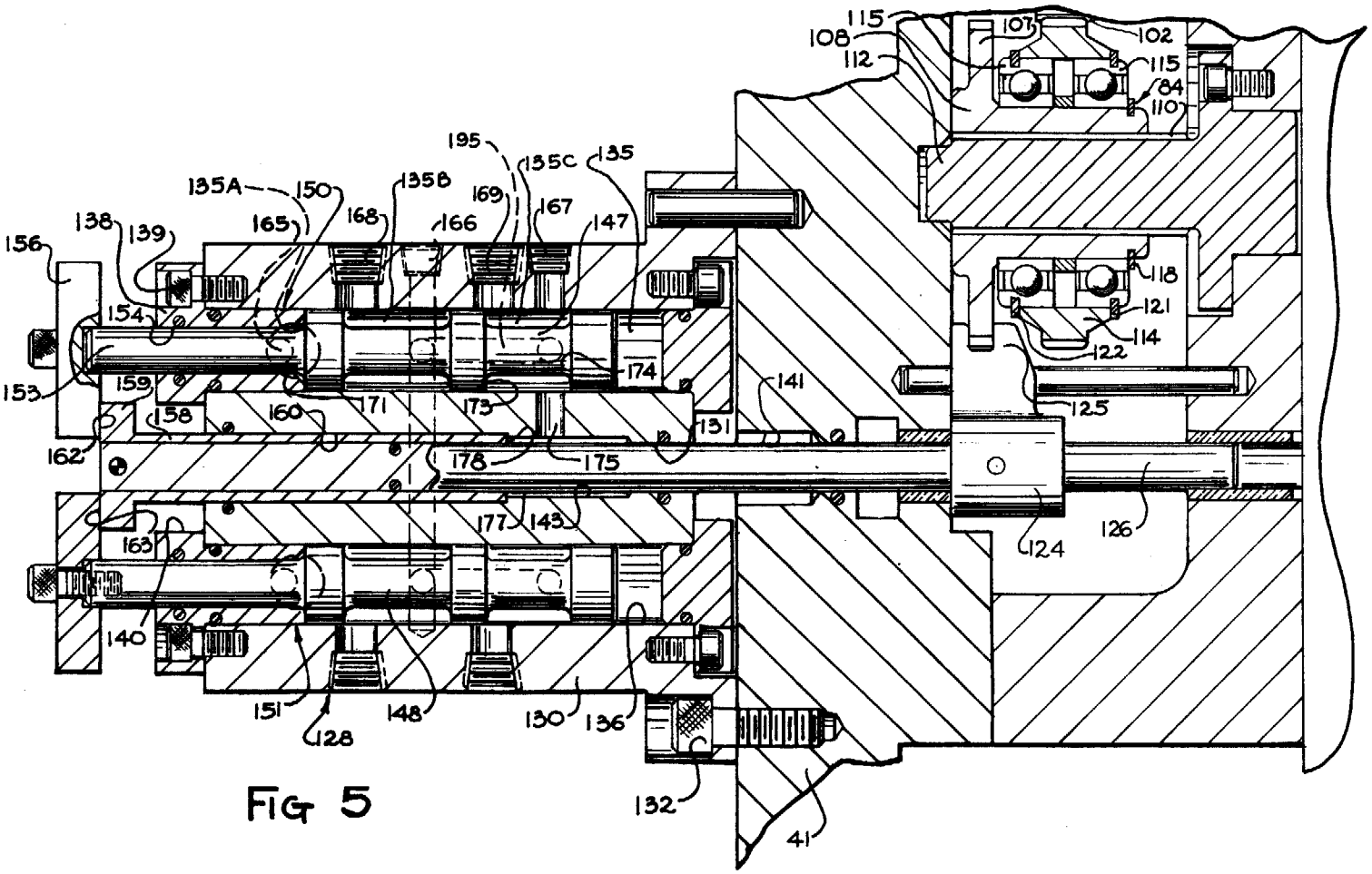
FIG. 5 is an enlarged fragmentary side view of the checker valve and also showing the engagement of the shifting fork to the ring gear of the shiftable gear mechanism.

The shiftable gear assembly 84, as shown in FIGS. 4 and 5, is provided with a locking plate 107 having an extending tubular sleeve portion 108. The locking plate 107 is provided with internal splines (not shown) which are slidably engaged with complementary splines 110 that are formed on shaft 112. Shaft 112 is fixedly secured in the gear drive box 41. A gear 114 is carried for rotation relative to locking plate 107 on the outer races of a pair of bearings 115 and 116. The bearings 115 and 116, in turn, are mounted on the extending sleeve portion 108 of the locking plate 107. Therefore, gear 114 is free to rotate while the locking plate 107, coupled by its spindles (not shown) with the complementary splines 110 of stationary shaft 112, remains in its angular fixed position. Ring gear 114 is always in mesh with motor output gear 104 so as to transmit power from the DC motor 40 to either the X-axis drive gear 102 or the index table drive gear 98, selectively.

A shifting fork 124 is used to effect the axial movement of the shiftable gear assembly 84 from its leftward position, as viewed in FIG. 5, where the shiftable gear assembly is engaged with the X-axis drive gear 102, to its rightward position where the shiftable gear assembly 84 is engaged with the index drive gear 98. The shifting fork 124 is secured to an actuating rod 126 of a hydraulic actuator assembly 128. The bifurcated extending end 125 of the shifting fork 24 engages either side of the index locking plate 107. Thus, when the hydraulic actuator assembly 128 is actuated, the shifting fork 124 will move the shiftable gear assembly 84 axially along shaft 112 in one direction or the other.

FIGS. 4 and 5 show the actuating rod 126 biased to the left which, in turn, effects the engagement of the gear 114, of shiftable gear assembly 84, with the X-axis drive gear 102. When the actuating rod 126 is biased to the right, this will effect the engagement of gear 114 with the index table drive gear 98. Since the output gear 104 of DC motor 40 is always engaged with gear 114 of the shiftable gear assembly 84, the power output of motor 40 will be used to drive either the X-axis screw 38 or the index drive shaft 85, selectively.

As shown in FIG. 5, the hydraulic actuator assembly 128 for effecting the selective drive engagement of the X-axis screw 38 or the index table drive shaft 85 with the motor 40 is comprised of a valve body 130 having three axial bores 131, 135 and 136. The valve body 130 is secured to the external surface of the gear drive box 41 with screws 132. The outer or leftward end of axial bores 135 and 136 are closed by an end cap 138 which is secured with screws 139 to the outer end of valve body 130. The actuating rod 126 extends outwardly from the shifting fork 124 through a suitable opening 141 of gear box 41 and through the axial bore 131 and outwardly through an opening 140 of the outer end cap 138.

Slidably carried within the axial bores 135 and 136 are valve spools 147 and 148 respectively. Axial bores 135 and 136 in cooperation with the valve spools 147 and 148 respectively, form checker valve assemblies 150 and 151, respectively. Checker valves 150 and 151 regulate the raising and lowering of the index tables 34 and 34A, respectively. The construction and operation of checker valve 151 is the same as checker valve 150, so that the description of the construction and operation of the checker valve 150 will apply to checker valve 151. Axial bore 135 is divided by the spool 147 into three subchambers 135A, 135B and 135C. There are five ports, 165, 166, 167, 168 and 169 provided which communicate with the axial bore 135 of the checker valve assembly 150. Selective admission of hydraulic fluid into the axial bore 135 via these ports control the position of valve spool 147 and consequently the vertical movement of the index table 34.

As shown in FIG. 5, the leftwardly extending portion 153 of spool 147, passes through a ore 154 formed in the end closure cap 138. Secured on the extreme leftward end of spool portion 153 is a collar 156. A sleeve 158 having a flange portion 159 is secured to actuating rod 126 so that they move axially in unison. Sleeve 158 is carried for axial slidable movement in an enlarged diameter portion 160 of the bore 131. The arrangement is such that an inner surface 162 of collar 156 abuts a surface 163 of flange 159. Therefore, as checker valve 150 is actuated to effect the movement of spool 147 to the right, as viewed in FIG. 5, the engagement of collar 156 with flange 159 will effect the rightward movement of actuating rod 126. The rightward movement of actuating rod 126 will effect the movement of the gear 114 of the shiftable gear member assembly 105, out of engagement with the X-axis drive gear 102 and into engagement with the index table drive gear 98.

As shown in FIGS. 4 and 5, the actuating rod 126 is depicted in its extreme leftward position, which is the position it is in when the shifting fork 124 has effected the movement of the shiftable gear assembly 84 into engagement with the X-axis drive gear 102. Thus, the output of the common drive motor 40 is transmitted to the X-axis drive screw, via ring gear 114 and drive gear 102, to effect the rectilinear movement of the table base in one direction or the other, depending upon the rotation of motor 40.

When it is desired to connect the output of the common drive motor 40 to the index table drive gear 98 for effecting indexable movement of either table 34 or 34A, hydraulic pressure fluid will be supplied through port 165, into subchamber 135A to exert a force on spool surface 171 to move the spool 147 rightwardly as viewed in FIG. 5. As spool 147 moves to the right, hydraulic fluid in subchamber 135B will be drained through port 166 to an oil reservoir 181, as shown in FIG. 6. The rightward movement of spool 147 will effect the shifting of ring gear 114 from engagement with the X-axis drive gear 102 into meshing engagement with the index table drive gear 98, to effect the rotation of index drive shaft 85 in one direction or the other, depending upon the rotation of motor 40. This is true because as the spool 147 moves to the right, its attached collar 156 will engage flange 159 of actuating rod 126 to effect the axial movement of shifting fork 124 and the shiftable gear assembly 84 which is connected to the bifurcated end 125 of shifting fork 124.

When it is desired to disconnect the output of the common drive motor 40 from the index drive gear 98 and connect the output of the motor 40 to the X-axis drive gear 102, hydraulic pressure fluid will be supplied through port 167 to subchamber 135C, to apply a force to spool surfaces 173 and 174. As hydraulic pressure fluid is supplied to subchamber 135C it will flow through passage 175 formed in valve body 130 to supply pressure fluid to a chamber 177 formed by the bore 143 and the inner end of sleeve 158. The hydraulic pressure fluid in chamber 177 applies a force to end surface 178 of sleeve 158. Since the combined surface areas of surfaces 173 and 178 is greater than the area of surface 174, a differential force will be exerted to effect the leftward movement of piston rod 126. The leftward movement of piston rod 126 will effect leftward movement of the shifting fork 124, thereby shifting the sleeve 108 to reconnect the ring gear 114 with the X-axis drive gear 102.

The hydraulic circuit for driving the various components described is illustrated diagrammatically in FIGS. 6 and 6A and comprises a pump 180 connected to draw hydraulic fluid from the reservoir 181. The output of the pump 180 is discharged into a pressure line 182 with the exhaust fluid being carried back to the reservoir by return line 183.

Index table 34 is raised from the position shown in FIG. 6 to the position depicted in FIG. 6A by energizing solenoid 184 to actuate valve 185 to connect pressure line 182 to port 165 of checker valve 150. The hydraulic pressure fluid will pass through port 165 into subchamber 145A and exert a force on spool surface 171 to effect the rightward movement of spool 147 as viewed in FIG. 5. When spool surface 171 moves past port 168, hydraulic pressure fluid will flow out of port 168 and into annular chamber 189 of table base 24 via fluid conduit 188, as shown in FIG. 2. The hydraulic pressure fluid admitted to annular chamber 189 acts on a radial flange 194 of the collar 45 to effect upward movement of the collar, thereby elevating the index table 34. As the index table 34 is elevated, hydraulic pressure fluid will be exhausted from a chamber 193 located above radial flange 194, via fluid conduit 191 through port 169 of checker valve assembly 150. The fluid entering subchamber 135B via port 169 will pass out of drain port 166 to the reservoir 181. Also, as the spool 147 is moved to the right, the hydraulic fluid within subchamber 135C will exhaust through internal passage 195 formed within the spool 147 to subchamber 135B and, consequently, it will also exhaust through exhaust port 166 to return to reservoir 181.

As a prerequisite to the indexing of table 34, to rotatably position the workpiece, table base 24 has to be located along ways 23 at any 0.01 inch position. The positioning of table base 24 at any 0.01 inch position, along the X-axis will insure the meshing of the index locking plate 107 with the X-axis drive gear 102 and consequently it will insure the meshing of ring gear 114 with the index table drive gear 98 and the meshing of index table ring gear 60 with gear 77 of the idler gear assembly 62. If a wrong X-axis distance is called for, for example one not at a 0.01 inch position, such as 20.022, the teeth of locking gear 107 and the teeth of the drive gear 102 will not be in position to meshingly engage and, therefore, gears will hang up. This will prevent the actuating rod 126 from moving all the way to the right and, therefore, will not allow spool 147 to move all the way to the right and, therefore, port 168 will be blocked and pressure fluid entering port 165 will not be supplied to chamber 189 and consequently the index table 34 will remain in its lower position as depicted in FIG. 6. Consequently the index table will not rise and the X-axis position called for will have to be checked and corrected so that a 0.01 position is commanded.

When the shiftable gear assembly is shifted between the two drive gears 98 and 102 it is desirable to keep a fixed angular relationship between the rotor of the signal generator 42, which is connected to motor 40, and the two drive gears 98 and 102. To this end the locking plate 107 is used to angularly lock one of the drive gears 98 or 102 before it disengages the other.

As depicted in FIG. 4, the lower portion locking plate 107 is in mesh with the index locking plate 99 when the actuating rod 126 is in its leftward position. As the actuating rod 126 is moved to the right, it will be noted that the upper portion of locking plate 107 will engage and lock the X-axis drive gear 102 in its angular position before the lower portion of locking plate becomes disengaged from the index locking plate 99. When the shiftable gear assembly 84 is in its far right position, ring gear 114 is in driving engagement with the index table drive gear 98. When the leftward movement of the shiftable gear assembly 84 is effected by the movement of actuating rod 126, it will be noted that the lower section of locking plate 107 will engage and lock the index plate 99 in its angular position before the ring gear 114 becomes disengaged with the index table drive gear 98. Therefore the interaction of locking plate 107 with the X-axis drive gear 102 and with the index locking plate 99 will insure that the signal generator 42 will be in a fixed angular relation with both the X-axis drive gear 102 and the index table drive gear 98.

The index table 34 is lowered into table base 24 by deenergizing solenoid 184, valve 185 will be spring returned to the position shown in FIG. 6, to connect the pressure line 182 to port 167 of checker valve 150. Hydraulic fluid will pass through subchamber 145C and out of port 169 to fluid conduit 191 which is connected to annular chamber 193. The pressure fluid acting on the upper surface of the radial flange 194 will force the index table 34 downwardly. As the index table 34 is moved downwardly, the hydraulic fluid below radial flange 194 in annular chamber 189 is exhausted through conduit 188 to port 168 of checker valve 150. The hydraulic fluid entering chamber 135B will pass through drain port 166 to reservoir 181.

For example, let it be assumed that the index table 34 has been stopped at the 20.000 X-axis position and that the index table has been elevated. When the index table 34 is fully elevated, limit switch 57 is actuated and operates to allow the DC motor 40 to drive the index table 34. The X-axis signal generator 42 is driven by motor 40 and is utilized to control the rotation of the index table 34. To this end, gear ratios are used so that one revolution of the signal generator 42 is equal to one degree of index table movement. When the motor 40 is connected to the X-axis drive screw 38, gear ratios are used so that one revolution of the signal generator 42 is equal to 0.1 inch of X-axis travel. If we desire to rotate the now elevated index table 34, 20°, the signal generator 42 would have to be driven by motor 40 through 20 revolutions. One revolution of signal generator 42 equaling 1° of index table movement. To this end, the tape 33 would call for a new X-axis position of 22.000 inches. A new X-axis distance of 2.000 inches effects twenty revolutions of signal generator 42 since one tenth of an inch of X-axis travel called for by the tape 33 effects one revolution of signal generator 42.

After the necessary rotation, the index table 34 will be lowered. When the table is all the way down, limit switch 58 is actuated which operates to effect the next block of tape to be read. This is a miscellaneous function which counts the "X" position register back to where it started at the start of the index cycle. It is not necessary to move the signal generator 42, since the signal generator is in the same position as it was when it started the index cycle (20 signal generator revolutions will produce 20° of indexing at the table). When moving the axis position register back, it is done at a faster feed rate than the normal X-axis feed rate travel, to save time. After the X-axis position register is counted back to its original position before the index cycle began, the control 30 is now ready to read the next command from the input tape.

Although the illustrative embodiment of the invention has been described in considerable detail for the purpose of disclosing a practical operative structure whereby the invention may be practiced advantageously, it is to be understood that the particular apparatus described is intended to be illustrative only and that the novel characteristics of the invention may be incorporated in other structural forms without departing from the spirit and scope of the invention as defined in the subjoined claims.

The principles of this invention having now been fully explained in connection with the foregoing description, we hereby claim as our invention:

We claim:

[ 1. In a machine tool having table base supported for rectilinear movement along a supporting bed, said table base being provided with an index table supported by said table base for movement with it and for independent indexable movement relative to said table base;

a source of power;

a first drive means carried by the bed and operable to effect the rectilinear movement of said table base;

a second drive means carried by said table base and operable to effect the indexable movement of said index table;

coupling means operable when actuated to connect said source of power to said first drive means or to said second drive means selectively; and control means operable to actuate said coupling means and said power drive means for effecting rectilinear movement of said table or indexing movement of said index table selectively. ]

[ 2. In a machine tool having a bed supporting a table base for rectilinear movement along the bed, at least one index table carried by said table base and rotatably indexable about its axis;

power drive means operably connected to effect either the rectilinear movement of said table base or the rotary movement of said index table, selectively;

a first motion translating means located on said table base and operably connected to said bed to effect the rectilinear motion of said table base relative to said bed;

a second motion translating means carried by said table base and operably connected to said index table to effect the rotary motion of said index table;

coupling means operable to engage said power drive means with either said first or second motion translating means, selectively; and control means connected to said power drive means to regulate the operation of said power drive means;

whereby the rectilinear movement of said table base and the rotary movement of said index table may be selectively effected by operation of a single power drive. ]

[ 3. In a machine tool according to claim 2 wherein said first motion translating means includes a screw operably mounted on said table base parallel to the direction of rectilinear movement of said table base; and, a nut secured to said machine tool bed and operably connected to said screw. ]

[ 4. In a machine tool according to claim 2 wherein said second motion translating means includes a gear secured to said index table in coaxial relationship therewith;

a gear transmission carried by said table base;

means to effect engagement between said index table gear and said gear transmission; and, a drive shaft connected to receive the input drive from said power drive means and transmit it to said gear transmission. ]

[ 5. In a machine tool according to claim 4 wherein said coupling means includes a shiftable drive transmission operably disposed to engage said screw or said drive shaft selectively, said shiftable drive transmission being operably connected to receive the power input drive from said power drive means. ]

[ 6. A machine tool according to claim 2 wherein said power drive means includes a motor. ]

[ 7. A machine tool according to claim 2 wherein said control means includes a signal generator operative to provide a signal indicating the number of revolutions of said motor; and, a position register connected to said signal generator and operable to indicate either the amount of rectilinear distance said table base traveled or the amount of rotation of said index table, selectively. ]

*8. In a machine tool having a bed supporting a table base for rectilinear movement along the bed, at least one index table carried by said table base and rotatably indexable about its axis;*

*a motor;*

*a first motion translating means located on said table base and operably connected to said bed to effect the rectilinear motion of said table base relative to said bed;*

*a second motion translating means carried by said table base and operably connected to said index table to effect the rotary motion of said index table means operable to selectively couple said motor to either said first motion translating means or said second motion translating means for actuating said table base in its rectilinear motion or said index table in its rotary motion selectively; and*

*a single servo control loop for regulating the operation of said motor to control the movement of both of said tables individually so that said single servo control loop automatically regulates the operation of the longitudinally movable table in its rectilinear movement alone or the operation of the rotary table in its rotary movement alone depending upon which of said tables is being driven at the time.*

*9. In a machine tool according to claim 8 wherein said first motion translating means includes a screw operably mounted on said table base parallel to the direction of rectilinear movement of said table base; and*

*a nut secured to said machine tool bed and operably connected to said screw.*

*10. In a machine tool according to claim 8 wherein said second motion translating means includes a gear secured to said index table in coaxial relationship therewith;*

*a gear transmission carried by said table base;*

*coupling means to effect engagement between said index table gear and said gear transmission; and*

*a drive shaft connected to be rotated by said motor and being connected to drive said gear transmission.*

*11. In a machine tool according to claim 10 wherein said coupling means includes a shiftable drive transmission operably disposed to engage said screw or said drive shaft selectively, said shiftable drive transmission being operably connected to receive the power input drive from said motor.*

*12. A machine tool according to claim 8 wherein said single servo control loop includes a signal generator operative to provide a signal indicating the number of revolutions of said motor; and*

*a position register connected to said signal generator and operable to indicate either the amount of rectilinear distance said table base traveled or the amount of rotation of said index table, selectively.*

* * * * *